US007103087B2

(12) United States Patent  
Eastburn

(10) Patent No.: US 7,103,087 B2
(45) Date of Patent: Sep. 5, 2006

(54) FREQUENCY HOPPING SPREAD SPECTRUM SCHEME FOR RFID READER

(75) Inventor: David Lee Eastburn, Cedar Rapids, IA (US)

(73) Assignee: Intermec IP Corp., Everett, WA (US)

( * ) Notice: Subject to any disclaimer, the term of this patent is extended or adjusted under 35 U.S.C. 154(b) by 0 days.

(21) Appl. No.: 10/814,411

(22) Filed: Mar. 30, 2004

(65) Prior Publication Data

US 2004/0189443 A1 Sep. 30, 2004

Related U.S. Application Data

(60) Provisional application No. 60/459,414, filed on Mar. 31, 2003.

(51) Int. Cl.
*H04B 1/713* (2006.01)
*H04B 7/208* (2006.01)
*H04L 5/14* (2006.01)
*H04J 1/00* (2006.01)

(52) U.S. Cl. .............. 375/132; 370/295; 370/337; 370/344

(58) Field of Classification Search ............ 340/10.32; 370/94.1, 295, 302, 319, 322, 325, 344, 480, 370/481, 321, 329, 345, 436, 442, 449, 458, 370/498, 337; 375/202, 239, 271, 259, 130, 375/132, 133; 455/42, 63.3
See application file for complete search history.

(56) References Cited

U.S. PATENT DOCUMENTS 5,471,469 A * 11/1995 Flammer et al. ............ 370/346
5,533,025 A * 7/1996 Fleek et al. ................. 370/445
6,434,183 B1 * 8/2002 Kockmann et al. ......... 375/132
6,486,769 B1 * 11/2002 McLean ................... 340/10.32
6,862,438 B1 * 3/2005 Darabi ..................... 455/226.3
6,967,934 B1 * 11/2005 Kockmann et al. ......... 370/260
2002/0122405 A1 * 9/2002 Liang ........................ 370/344
2002/0186749 A1 * 12/2002 Jones ......................... 375/132
2003/0189638 A1 * 10/2003 Fry ............................ 348/154
2005/0141562 A1 * 6/2005 Chen et al. ................. 370/480

* cited by examiner

*Primary Examiner*—Dac Ha
*Assistant Examiner*—Linda Wong
(74) *Attorney, Agent, or Firm*—O'Melveny & Myers LLP

(57) ABSTRACT

A system and method is provided for implementing forced frequency "hops" if the time it takes to perform a particular transaction is greater than the time available on a particular carrier frequency. In one embodiment of the present invention, a radio frequency identification (RFID) base station processor (in conjunction with program information stored in a base station memory) is adapted to (i) determine the amount of time available on a particular carrier frequency (e.g., pursuant to Federal Communications Commission (FCC) regulations, European Telecommunications Standardization Institute (ETSI) regulations, etc.), (ii) determine the amount of time it would take to perform a particular transaction, and (iii) force the base station to "hop" to another carrier frequency if the transaction time is longer than the available time. In one embodiment of the present invention, the time it would take to perform a particular transaction is the time it would take to perform the next transaction. In another embodiment of the present invention, the time it would take to perform a particular transaction is the time it would take to perform the longest (or "worst-case") transaction. In alternate embodiments of the present invention, a transaction is defined as the transmission of information (e.g., data, commands, etc.) or both the transmission of information and the reception of related information.

21 Claims, 3 Drawing Sheets

FREQUENCY HOPPING SPREAD SPECTRUM SCHEME FOR RFID READER

CROSS-REFERENCE TO RELATED APPLICATION

This application claims benefit pursuant to 35 U.S.C. § 119(e) of U.S. Provisional Application No. 60/459,414 filed Mar. 31, 2003, which application is specifically incorporated herein, in its entirety, by reference.

BACKGROUND OF THE INVENTION

1. Field of the Invention

The present invention relates to a frequency hopping spread spectrum (FHSS) scheme for radio frequency identification (RFID) devices, and more particularly to a system and method for improving transmission rates in an RFID device by implementing forced frequency "hops."

2. Description of Related Art

Radio Frequency Identification (RFID) base stations, which operate in conjunction with RFID transponders (tags), are used in a variety of applications (e.g., inventory-control, security, etc.). Typically, an item including an RFID tag (e.g., a container with an RFID tag inside) is brought into a "read zone" established by the base station. The base station transmits an interrogating RF signal that is modulated, in part, by the receiving tag. That is, in reading the tag, the base station generates and transmits a continuous wave electromagnetic disturbance at a particular carrier frequency. This disturbance is then modulated by the receiving tag in order to impart information (e.g., information stored within the tag) into the signal. The modulated RF signal is then reflected back to the base station where the imparted information is extracted.

When interrogating an RFID tag, however, the amount of time that can be spent on a particular carrier frequency is regulated by the Federal Communications Commission (FCC). The FCC, at least with respect to the Instrumentation, Scientific and Medical (ISM) bands, only allows transmitters operating under the Frequency Hopping Spread Spectrum (FHSS) methodology to continuously transmit over a particular carrier frequency for up to four hundred milliseconds. After that, the transmitter is required to transmit over a different carrier frequency (i.e., "hop" to a new carrier frequency). For example, a transmitter could transmit an RF signal for four hundred milliseconds over a first frequency, "hop" to a second frequency, transmit an RF signal for four hundred milliseconds over the second frequency, "hop" to a third frequency, etc.

One of the drawbacks associated with traditional FHSS systems is that time is wasted when the transmitter is not transmitting (i.e., when the transmitter is "dwelling"). Dwelling results from two common FHSS characteristics—(i) frequency synchronization and (ii) transmission/allocation time variance. First, FHSS systems are traditionally designed to operate using synchronized frequencies. In other words, in most FHSS systems, the frequency at which the transmitter is transmitting needs to be same as (or synchronized with) the frequency at which the receiver is receiving. This is typically achieved by using a common algorithm (i.e., an algorithm known to both the transmitter and the receiver). For example, a common algorithm may dictate that the available bandwidth (i.e., the frequency spectrum) is to be divided into seventy-five channels (i.e., seventy-five frequencies), and that the first communication cycle is to be transmitted over the first channel for four hundred milliseconds, the second communication cycle is to be transmitted over the second channel for four hundred milliseconds, etc.

By following the common algorithm, the transmitter and the receiver are able to "hop" from channel to channel in unison. If the transmitter were to "hop" early (e.g., "hop" to the second channel before the elapse of four hundred milliseconds), the system would become unsynchronized. In other words, the transmitter would be transmitting data over the second channel while the receiver (in accordance with the algorithm) would be attempting to receive data over the first channel. Therefore, it is imperative that the transmitter follow the common algorithm and remain at each channel for the prescribed amount of time.

This raises the next issue—i.e., transmission/allocation time variance, or whether there is a variance between the time it takes to transmit data and the time allotted (or prescribed) by the common algorithm. For example, if the allotted time is four hundred milliseconds and it takes one hundred and fifty milliseconds to transmit one item of data, then two items of data (i.e., three hundred milliseconds worth) is all that can be transmitted over a single channel. This is because it would take four hundred and fifty milliseconds to transmit three items of data, which would violate the time allotted (i.e., pursuant to FCC regulations). This results in a dwelling period of one hundred milliseconds per channel (i.e., the allotted time minus the transmitting time equals the dwelling period).

While dwelling periods are often associated with systems having the above-mentioned characteristics, they are not limited to such systems. For example, an FHSS system that does not require frequency synchronization may still experience dwelling periods. This is because non-synchronized FHSS systems typically operate under the assumption that maximum transmission rates are achieved by minimizing the "hop" rate. In other words, a maximum transmission rate will be achieved by spending more time transmitting data and less time "hopping" from channel to channel.

Traditional RFID systems operating under the FHSS methodology do not require frequency synchronization. This is because RFID tags can be designed to receive, without "hopping," signals transmitted over various carrier frequencies. This leaves the RFID base station free to "hop" unilaterally (i.e., without using a common algorithm). Nonetheless, because such systems typically operate under the assumption that maximum transmission rates are synonymous with minimum "hop" rates, algorithms are employed to "hop" only after the expiration of the time allotted by the FCC (i.e., four hundred milliseconds). The drawback with such a system (i.e., fixing the "hop" period) is that a dwelling period is created if the transmission time is not equal to the time allotted by the FCC, as previously explained.

Thus, it would be advantageous to provide an FHSS scheme that forced RFID base stations to "hop" instead of "dwell" when timing constraints prohibit the transmission of additional data.

SUMMARY OF THE INVENTION

The present invention provides a system and method for improving transmission rates in RFID base stations by implementing forced frequency "hops." In a preferred embodiment of the present invention, the RFID base station is adapted to calculate whether the next transaction can be performed over the current carrier frequency or whether a "hop" to a new carrier frequency should be forced. More particularly, in one embodiment of the present invention, a base station processor (in conjunction with program information stored in a base station memory) is adapted to (i) determine the amount of time available on a particular carrier frequency (e.g., pursuant to FCC regulations, European Telecommunications Standardization Institute (ETSI) regulations, etc.), (ii) determine the amount of time it would take to perform a particular transaction, and (iii) force the base station to "hop" to another carrier frequency if the transaction time is longer than the available time. Such a system improves transmission rates by forcing a "hop," as opposed to dwelling, when the transaction time is longer than the available time. In one embodiment of the present invention, the time it would take to perform a particular transaction is the time it would take to perform the next transaction. In another embodiment of the present invention, the time it would take to perform a particular transaction is the time it would take to perform the longest (or "worst-case") transaction.

A more complete understanding of the system and method for improving transmission rates in RFID base stations by implementing forced frequency "hops" will be afforded to those skilled in the art, as well as a realization of additional advantages and objects thereof, by a consideration of the following detailed description of the preferred embodiment. Reference will be made to the appended sheets of drawings which will first be described briefly.

DETAILED DESCRIPTION OF THE PREFERRED EMBODIMENTS

The present invention provides a system and method for improving transmission rates in RFID base stations by implementing forced frequency "hops." In the detailed description that follows, like element numerals are used to describe like elements illustrated in one or more figures.

Figure 1:
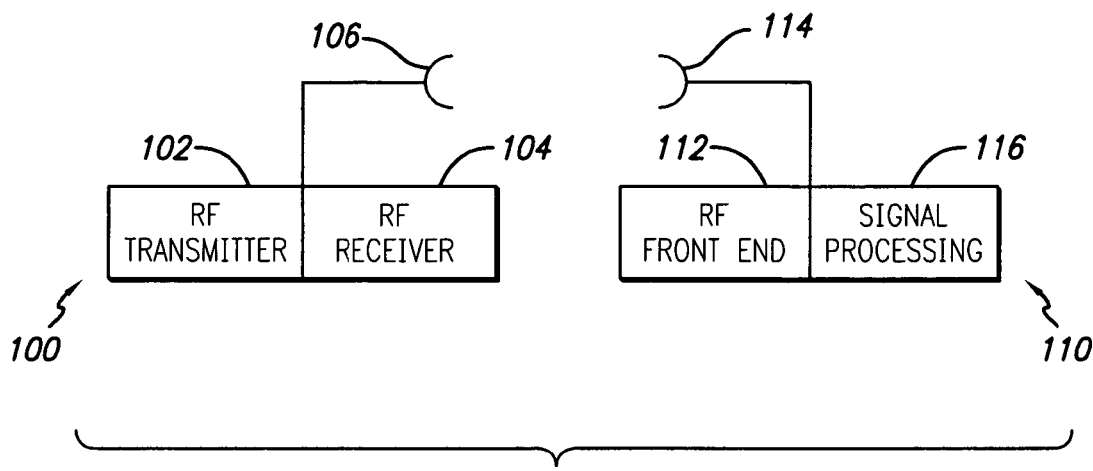
FIG. 1 is a conceptual block diagram of a RFID system including a base station and an RFID tag.

An RFID system in accordance with the principles of the present invention is illustrated in the conceptual block diagram of FIG. 1. A base station 100 includes (in part) an RF transmitter 102, an RF receiver 104, and an antenna 106 connected to the transmitter 102 and receiver 104. An RFID tag 110 such as may be used in conjunction with the base station 100 includes an RF front end 112, a signal processing section 116, and an antenna 114. The RFID tag 110 may further include a memory (not shown) in which data may be stored, retrieved and/or written.

In reading the RFID tag 110, the base station 100 interrogates the tag 110 by generating an RF signal over a carrier frequency. The carrier frequency, and more particularly the amount of time spent transmitting over a particular carrier frequency, will be discussed in more detail below. The RF signal is coupled to the antenna 106 and transmitted to the tag 110. The RF signal emitted by the antenna 106 will, ostensibly, be received by the tag antenna 114 if the tag 110 is within the transmitting range of the base station 100. If the field strength of the RF signal satisfies a predetermined read threshold requirement, the RFID tag 110 will respond to the reception of the signal by modulating the RF carrier to impart information about the tag onto the back-scattered RF field. The RF field is then propagated to the base station 100, where the imparted information can be extracted.

Figure 2:
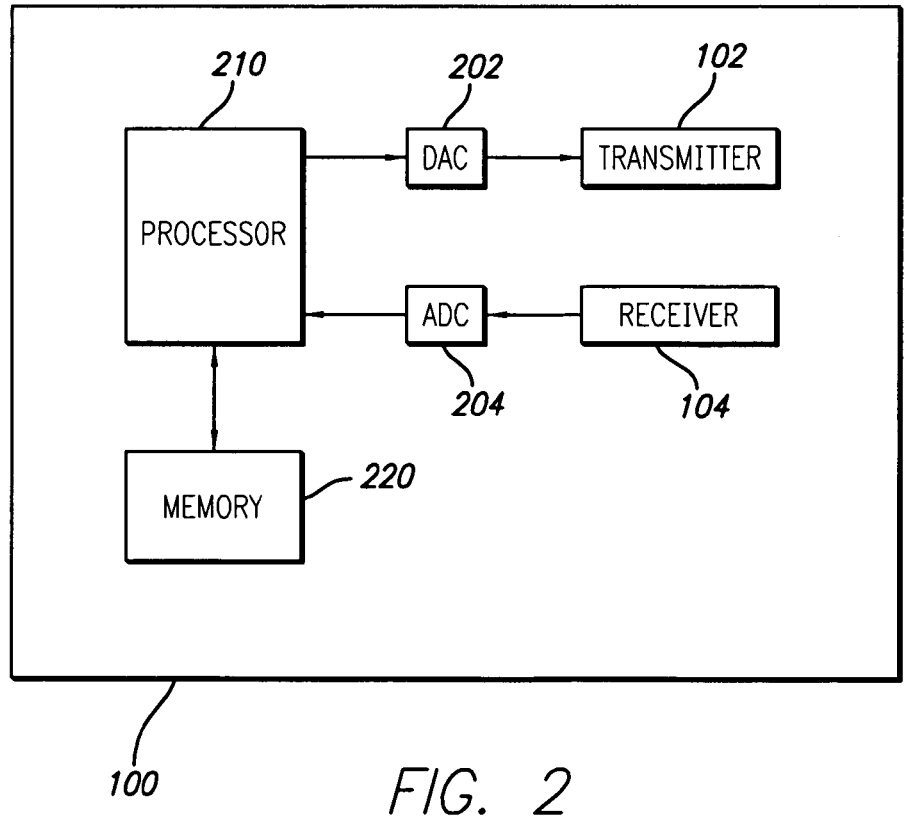
FIG. 2 further illustrates the RFID base station depicted in FIG. 1.

A more detailed diagram of the RFID base station 100 is shown in FIG. 2. Specifically, in a preferred embodiment, the base station 100 includes a memory device 220 and a processor 210 connected to an RF transmitter 102 and an RF receiver 104 via a digital-to-analog (D/A) converter 202 and an analog-to-digital (A/D) converter 204, respectively. When interrogating the RFID tag, digital signal data (in accordance with information stored in the memory device 220 and information provided by a host application (not shown)) is provided by the processor 210, converted into analog signal data by the D/A converter 202, and transmitted to the RFID tag via the transmitter 102 (or more particularly via the antenna connected to the transmitter (see FIG. 1)). Back-scattered data is then received by the receiver 104 (or more particularly the antenna connected to the receiver (see FIG. 1)), converted into digital data by the A/D converter 204, and provided to the processor 210 (e.g., to be further processed, stored in memory 220, provided to the host application (not shown), etc.).

It should be appreciated that the memory device 220 depicted in FIG. 2 includes, but is not limited to, RAM, cache memory, flash memory, EPROMs, EEPROMs, hard drives, removable drives and all other types of data storage devices generally known to those skilled in the art. It should further be appreciated that the processor 210 depicted in FIG. 2 includes, but is not limited to, application specific integrated circuits (ASICs), processors, microprocessors, programmable devices and all other computing devices generally known to those skilled in the art. It should also be appreciated that the location, type, and/or number of components illustrated in FIG. 2 are merely to exemplify the environment in which the present invention operates, and should not be considered limitations of the present invention. For example, a RFID base station including more than one memory device, having components in different locations (e.g., a D/A converter within the transmitter, a memory device external to the base station, etc.), or having additional (or fewer) components is within the spirit and scope of the present invention.

In a preferred embodiment of the present invention, the RFID base station is adapted to calculate whether enough time is available to perform the next transaction over the current carrier frequency or whether the base station should "hop" to a new carrier frequency before performing the transaction. This is because the Federal Communications Commission (FCC), for example, regulates the amount of time that can be spent on certain carrier frequencies. As described above, in Frequency Hopping Spread Spectrum (FHSS) devices, the FCC limits the time that can be spent (continuously) on a particular carrier frequency to four hundred milliseconds.

Referring again to FIG. 2, the processor 210 (in conjunction with information stored in memory 220 and/or information provided by the host application (not shown)) is adapted to determine whether enough time is available to perform the next transaction over the current carrier frequency or whether the base station should "hop" to a new carrier frequency before commencing the transaction. More particularly, in one embodiment of the present invention, the processor 210 (in conjunction with the stored and/or provided information) is adapted to (i) determine the amount of time available on a particular carrier frequency (e.g., pursuant to FCC regulations, ETSI regulations, etc.), (ii) determine the amount of time it would take to perform a particular transaction (e.g., transmit the next item of data, transmit the largest item of data (i.e., worst-case scenario), etc.), and (iii) force a "hop" to another carrier frequency if the transaction time is longer than the available time.

Figure 3:
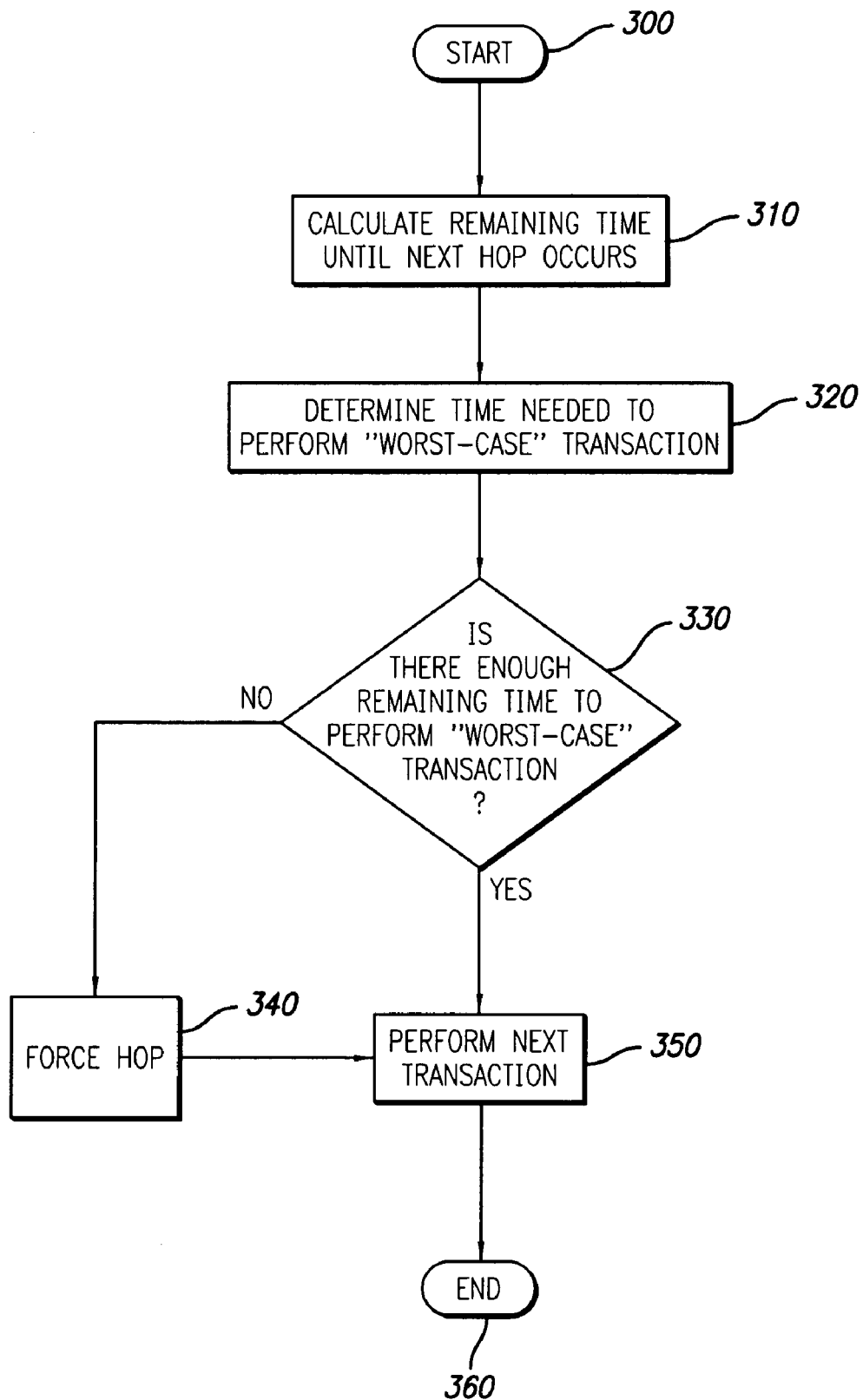
FIG. 3 is a flow chart illustrating one embodiment of the present invention.

One method of increasing the transmission rate of an RFID base station is illustrated in FIG. 3. Specifically, starting at step 300, the amount of time available on a particular carrier frequency is calculated at step 310. In traditional RFID systems, this amount of time coincides with the next "hop" (i.e., "hop" after the allotted time expires).

At step 320, the amount of time it would take to perform the longest possible transaction (i.e., the "worst-case" transaction) is determined. For example, if two possible transactions existed (i.e., data read and data write), a data read transaction takes fifty milliseconds, and a data write transaction takes one hundred milliseconds, the longer of the two transactions (i.e., data write) would be used. The information collected during steps 310 and 320 is then used to calculate whether the next transaction can be performed over the current carrier frequency at step 330 (i.e., whether the transaction time is less than the available time). If the answer is "Yes," then the next transaction is performed at step 350, ending the process at step 360. Alternatively, if the answer is "No," then a "hop" is forced at step 340 (i.e., the base station "hops" to a new carrier frequency) and the next transaction is performed over the new carrier frequency at step 350, ending the process at step 360.

Figure 4:
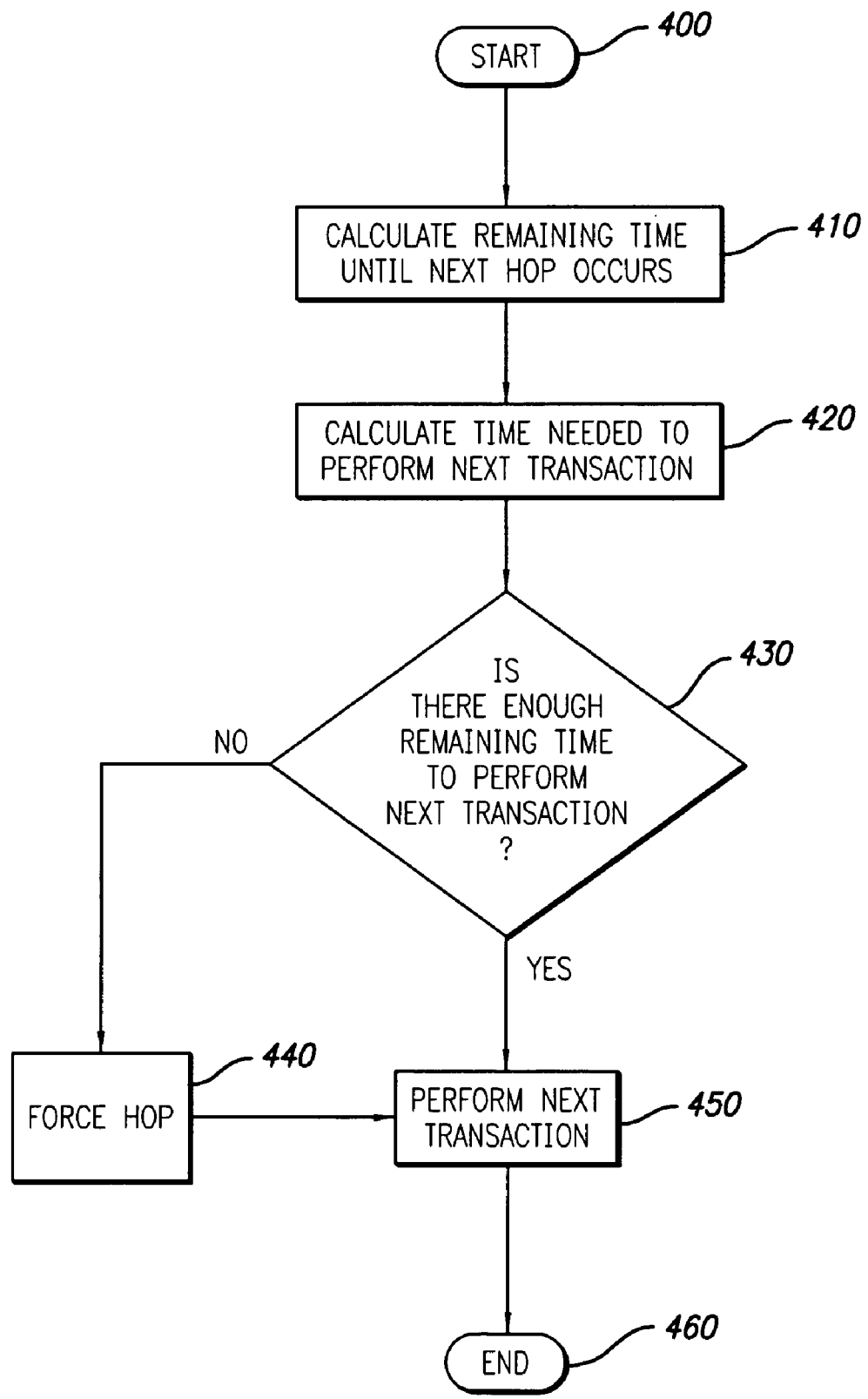
FIG. 4 is a flow chart illustrating another embodiment of the present invention.

Another method of increasing the transmission rate of an RFID base station is illustrated in FIG. 4. Specifically, starting at step 400, the amount of time available on a particular carrier frequency is calculated at step 410. At step 420, the amount of time it would take to perform the next transaction (e.g., transmit the next item of information, etc.) is calculated. This information is then used at step 430 to calculate whether the next transaction can be performed over the current carrier frequency (i.e., whether the transaction time is less than the available time). If the answer is "Yes," then the next transaction is performed at step 450, ending the process at step 460. Alternatively, if the answer is "No," then a "hop" is forced at step 440 (i.e., the base station "hops" to a new carrier frequency) and the next transaction is performed over the new frequency at step 450, ending the process at step 460.

Having thus described embodiments of a system and method for improving transmission rates in RFID base stations, it should be apparent to those skilled in the art that certain advantages of the system have been achieved. It should also be appreciated that various modifications, adaptations, and alternative embodiments thereof may be made within the scope and spirit of the present invention. The invention is further defined by the following claims.

The invention claimed is:

1. A radio frequency identification (RFID) system, comprising:
    an RFID base station adapted to communicate with at least one RFID transponder; said RFID base station comprising:
        a transmitter adapted to transmit radio frequency (RF) signals to said at least one RFID transponder;
        a receiver adapted to receive RF signals backscattered from said at least one RFID transponder; and
        a processor electrically connected to said transmitter and said receiver, and adapted to:
            determine the amount of time available on a first carrier frequency;
            determine the amount of time it would take to perform a particular transaction, wherein said particular transaction comprises a worst-case transaction, such that said processor is adapted to determine the amount of time it would take to perform the longest possible transaction; and
            change to a second carrier frequency before said amount of time available on said first carrier frequency expires when said amount of time on said first carrier frequency is less than said amount of time it would take to perform said particular transaction.

2. A radio frequency identification (RFID) system, comprising:
    an RFID base station adapted to communicate with at least one RFID transponder; said RFID base station comprising:
        a transmitter adapted to transmit radio frequency (RF) signals to said at least one RFID transponder;
        a receiver adapted to receive RF signals backscattered from said at least one RFID transponder; and
        a processor electrically connected to said transmitter and said receiver, and adapted to:
            determine the amount of time available on a first carrier frequency;
            determine the amount of time it would take to perform a particular transaction, wherein said particular transaction comprises a worst-case transaction, such that said processor is adapted to determine the amount of time it would take to perform the longest possible transaction with said at least one RFID transponder; and
            change to a second carrier frequency before said amount of time available on said first carrier frequency expires when said amount of time on said first carrier frequency is less than said amount of time it would take to perform said particular transaction.

3. A radio frequency identification (RFID) system, comprising:
    an RFID base station adapted to communicate with at least one RFID transponder in accordance with a predetermined hopping sequence defined by a frequency hopping algorithm; said RFID base station comprising:
        a transmitter adapted to transmit radio frequency (RF) signals to said at least one RFID transponder;
        a receiver adapted to receive RF signals backscattered from said at least one RFID transponder; and
        a processor electrically connected to said transmitter and said receiver, and adapted to:
            determine the amount of time available on a first carrier frequency of the hopping sequence;
            determine the amount of time it would take to perform a particular transaction, wherein said particular transaction is a transmission of a particular RF signal, such that said processor is adapted to determine the amount of time it would take to transmit said particular RF signal; and
            change to a second carrier frequency of the hopping sequence before said amount of time available on said first carrier frequency expires when said amount of time on said first carrier frequency is less than said amount of time it would take to perform said particular transaction.

4. The RFID system of claim 3, further comprising said at least one RFID transponder.

5. The RFID system of claim 3, wherein said RFID base station further comprises a memory device electrically connected to said processor, wherein said memory device is adapted to store at least partial program information as to when said processor should hop to a different carrier frequency.

6. The RFID system of claim 5, further comprising an analog-to-digital (A/D) converter, said A/D converter electrically connecting said processor to said receiver.

7. The RFID system of claim 3, further comprising a digital-to-analog (D/A) converter, said D/A converter electrically connecting said processor to said transmitter.

8. The RFID system of claim 3, further comprising a transceiver, said transceiver comprising said transmitter and said receiver.

9. A radio frequency identification (RFID) system, comprising:
an RFID base station adapted to communicate with at least one RFID transponder; said RFID base station comprising:
a transmitter adapted to transmit radio frequency (RF) signals to said at least one RFID transponder;
a receiver adapted to receive RF signals backscattered from said at least one RFID transponder; and
a processor electrically connected to said transmitter and said receiver, and adapted to:
determine the amount of time available on a first carrier frequency;
determine the amount of time it would take to perform a particular transaction, wherein said particular transaction is both a transmission of a particular RF signal and an expected reception of a particular RF signal in response thereto, such that said processor is adapted to determine the amount of time it would take to transmit said particular RF signal and the expected amount of time it would take to receive said particular RF signal in response thereto; and
change to a second carrier frequency before said amount of time available on said first carrier frequency expires when said amount of time on said first carrier frequency is less than said amount of time it would take to perform said particular transaction.

10. A method for improving transmission rates in a radio-frequency-identification (RFID) base station, comprising:
performing a first transaction with at least one RFID transponder over a first carrier frequency;
determining the amount of time available on said first carrier frequency;
determining the amount of time it would take to perform a worst-case transaction, said worst-case transaction being the longest transaction that can be performed by said RFID base station;
forcing said RFID base station to hop to a second carrier frequency before said amount of time available on said first carrier frequency expires when said amount of time on said first carrier frequency is less than said amount of time it would take to perform said worst-case transaction.

11. A method for improving transmission rates in a radio-frequency-identification (RFID) base station, comprising:
performing a first transaction with at least one RFID transponder over a first carrier frequency;
determining the amount of time available on said first carrier frequency;
determining the amount of time it would take to perform a worst-case transaction, said worst-case transaction being the longest transaction that can be performed by said RFID base station and with said at least one RFID transponder;
forcing said RFID base station to hop to a second carrier frequency before said amount of time available on said first carrier frequency expires when said amount of time on said first carrier frequency is less than said amount of time it would take to perform said worst-case transaction.

12. A method for improving transmission rates in a radio-frequency-identification (RFID) base station, comprising:
performing a first transaction with at least one RFID transponder over a first carrier frequency in a predetermined hopping sequence;
determining the amount of time available on said first carrier frequency;
determining the amount of time it would take to transmit a particular radio frequency (RF) signal;
forcing said RFID base station to hop to a second carrier frequency in the predetermined hopping sequence before said amount of time available on said first carrier frequency expires when said amount of time on said first carrier frequency is less than said amount of time it would take to transmit said particular RF signal.

13. The method of claim 12, wherein said step of performing a first transaction with at least one RFID transponder further comprises transmitting a first RF signal to said at least one RFID transponder, said first RF signal and said particular RF signal each comprising information selected from a list of information consisting of commands and data.

14. A method for improving transmission rates in a radio-frequency-identification (RFID) base station, comprising:
performing a first transaction with at least one RFID transponder over a first carrier frequency;
determining the amount of time available on said first carrier frequency;
determining the amount of time it would take to transmit a particular radio frequency (RF) signal and an amount of time that it might take to receive a responsive RF signal from said at least one RFID transponder;
forcing said RFID base station to hop to a second carrier frequency before said amount of time available on said first carrier frequency expires when said amount of time on said first carrier frequency is less than said amount of time it would take to transmit said particular RF signal and said amount of time it might take to receive said responsive RF signal from said at least one RFID transponder.

15. A method for improving transmission rates in a radio-frequency-identification (RFID) base station, comprising:
performing a first transaction with at least one RFID transponder over a first carrier frequency;
determining the amount of time available on said first carrier frequency;
determining the amount of time it would take to transmit a particular radio frequency (RF) signal;
forcing said RFID base station to hop to a second carrier frequency before said amount of time available on said first carrier frequency expires when said amount of time on said first carrier frequency is less than said amount of time it would take to transmit said particular RF signal;

wherein said step of determining the amount of time available on said first carrier frequency further comprises comparing the amount of time that the RFID base station has continuously been on said first carrier frequency to an amount of time permitted by the Federal Communications Commission (FCC).

16. A method for improving transmission rates in a radio-frequency-identification (RFID) base station, comprising:

performing a first transaction with at least one RFID transponder over a first carrier frequency;

determining the amount of time available on said first carrier frequency;

determining the amount of time it would take to transmit a particular radio frequency (RF) signal;

forcing said RFID base station to hop to a second carrier frequency before said amount of time available on said first carrier frequency expires when said amount of time on said first carrier frequency is less than said amount of time it would take to transmit said particular RF signal;

wherein said step of determining the amount of time it would take to transmit a particular RF signal is performed prior to said step of determining the amount of time available on said first carrier frequency.

17. A frequency-hopping-spread-spectrum (FHSS) method for use in a radio-frequency-identification (RFID) device, comprising:

transmitting a first radio frequency (RF) signal over a first carrier frequency;

determining the amount of time available on said first carrier frequency;

determining the amount of time it would take to transmit a particular RF signal;

transmitting a second RF signal over said first carrier frequency when said amount of time available on said first carrier frequency is greater than said amount of time it would take to transmit said particular RF signal; and transmitting a second RF signal over a second carrier frequency when said amount of time available on said first carrier frequency is less than said amount of time it would take to transmit said particular RF signal.

18. The FHSS method of claim 17, wherein said step of determining the amount of time it would take to transmit a particular RF signal further comprises determining the amount of time it would take to transmit said second RF signal.

19. The FHSS method of claim 17, further comprising the step of determining the amount of time it would take to receive a modulated RF signal, said steps of transmitting a second RF signal further comprise:

transmitting a second RF signal over said first carrier frequency when said amount of time available on said first carrier frequency is greater than the product of said amount of time it would take to transmit said particular RF signal and said amount of time it would take to receive said modulated RF signal; and transmitting a second RF signal over said second carrier frequency when said amount of time available on said first carrier frequency is less than the product of said amount of time it would take to transmit said particular RF signal and said amount of time it would take to receive said modulated RF signal.

20. A frequency-hopping-spread-spectrum (FHSS) method for use in a radio-frequency-identification (RFID) device, comprising:

transmitting a first radio frequency (RF) signal over a first carrier frequency;

determining the amount of time available on said first carrier frequency;

determining the amount of time it would take to transmit a particular RF signal;

transmitting a second RF signal over said first carrier frequency when said amount of time available on said first carrier frequency is greater than said amount of time it would take to transmit said particular RF signal; and transmitting a second RF signal over a second carrier frequency when said amount of time available on said first carrier frequency is less than said amount of time it would take to transmit said particular RF signal;

wherein said step of determining the amount of time it would take to transmit a particular RF signal further comprises determining the amount of time it would take to transmit an RF signal having the longest transmission time of any RF signal that might be transmitted by said RFID device.

21. A frequency-hopping-spread-spectrum (FHSS) method for use in a radio-frequency-identification (RFID) device, comprising:

transmitting a first radio frequency (RF) signal over a first carrier frequency;

determining the amount of time available on said first carrier frequency;

determining the amount of time it would take to transmit a particular RF signal;

transmitting a second RF signal over said first carrier frequency when said amount of time available on said first carrier frequency is greater than said amount of time it would take to transmit said particular RF signal;

transmitting a second RF signal over a second carrier frequency when said amount of time available on said first carrier frequency is less than said amount of time it would take to transmit said particular RF signal; and determining the amount of time it would take to receive a modulated RF signal;

wherein said steps of transmitting a second RF signal further comprise:

transmitting a second RF signal over said first carrier frequency when said amount of time available on said first carrier frequency is greater than the product of said amount of time it would take to transmit said particular RF signal and said amount of time it would take to receive said modulated RF signal; and transmitting a second RF signal over said second carrier frequency when said amount of time available on said first carrier frequency is less than the product of said amount of time it would take to transmit said particular RF signal and said amount of time it would take to receive said modulated RF signal; and wherein said steps of determining amounts of time it would take to transmit a particular RF signal and receive a modulated RF signal further comprise:

determining the amount of time it would take to transmit an RF signal having the longest transmission time of any RF signal that might be transmitted by said RFID device; and determining the amount of time it might take to receive a modulated RF signal in response to transmitting said RF signal having the longest transmission time.

* * * * *